(12) United States Patent
Kishida et al.

(10) Patent No.: US 9,284,403 B2
(45) Date of Patent: Mar. 15, 2016

(54) METHOD TO PRODUCE SEMI-CRYSTALLINE POLYLACTIDES

(75) Inventors: Hisanori Kishida, Osaka (JP); Takashi Hasegawa, Osaka (JP); Nobuyoshi Nomura, Nagoya (JP); Makoto Takahashi, Nagoya (JP); Joseph Schroeder, Minnetonka, MN (US); Manuel Natal, Minnetonka, MN (US)

(73) Assignees: Hitachi Zosen Corporation, Osaka-shi (JP); Tohoku Electric Power Co., Inc., Sendai-shi (JP); National University Corporation Nagoya University, Nagoya-shi (JP); NatureWorks LLC, Minnetonka, MN (US)

( * ) Notice: Subject to any disclaimer, the term of this patent is extended or adjusted under 35 U.S.C. 154(b) by 0 days.

(21) Appl. No.: 14/343,912

(22) PCT Filed: Sep. 11, 2012

(86) PCT No.: PCT/JP2012/074308
§ 371 (c)(1),
(2), (4) Date: Nov. 21, 2014

(87) PCT Pub. No.: WO2013/039266
PCT Pub. Date: Mar. 21, 2013

(65) Prior Publication Data
US 2015/0087799 A1    Mar. 26, 2015

(30) Foreign Application Priority Data
Sep. 12, 2011   (JP) ................................. 2011-198712

(51) Int. Cl.
*C08G 63/00*   (2006.01)
*C08G 63/08*   (2006.01)
*C08G 63/82*   (2006.01)

(52) U.S. Cl.
CPC .............. *C08G 63/08* (2013.01); *C08G 63/823* (2013.01)

(58) Field of Classification Search
CPC .......... C08G 63/85; C08G 63/82; C08G 63/78
USPC .......... 528/271, 272, 279, 283, 302, 354, 357
See application file for complete search history.

(56) References Cited

U.S. PATENT DOCUMENTS

| | | | |
|---|---|---|---|
| 2,703,316 A | 3/1955 | Schneider et al. | |
| 6,214,967 B1 | 4/2001 | Jansson et al. | |
| 2007/0238167 A1* | 10/2007 | Perez et al. | 435/325 |
| 2009/0198038 A1* | 8/2009 | Arnold | 528/283 |

FOREIGN PATENT DOCUMENTS

| | | |
|---|---|---|
| JP | 2001-513121 A | 8/2001 |
| JP | 2003-064174 A | 3/2003 |
| JP | 2009-001614 A | 1/2009 |
| JP | 2009-144127 A | 7/2009 |

OTHER PUBLICATIONS

Shimadzu-hyoron, vol. 56, 1999, pp. 163-168 with English abstract, cover pages and last page.
International Search Report dated Dec. 25, 2012, issued for PCT/JP2012/074308.

* cited by examiner

*Primary Examiner* — Terressa Boykin
(74) *Attorney, Agent, or Firm* — Locke Lord LLP; James E. Armstrong, IV; Nicholas J. DiCeglie, Jr.

(57) ABSTRACT

This invention provides a method for synthesizing semi-crystalline polylactides (PLA) even from a lactide mixture including meso-LA and rac-LA. According to the invention, when a mixture of racemic lactide and meso-lactide ispolymerized using a catalyst capable of iso-selectively polymerizing L-lactide and D-lactide, an amorphous poly (meso-lactide) block is formed from meso-lactide and a semi-crystalline poly (racemic lactide) block is formed from racemic lactide by separately polymerizing racemic lactide and meso-lactide by taking advantage of a difference in physicochemical properties between racemic lactide and meso-lactide, whereby polylactide which is semi-crystalline as a whole is produced.

4 Claims, 5 Drawing Sheets

METHOD TO PRODUCE SEMI-CRYSTALLINE POLYLACTIDES

TECHNICAL FIELD

The present invention relates to a method to produce semi-crystalline polylactides via the polymerization of three lactide isomers.

Polylactide as used herein is synonymous with poly (lactic acid), and hereinafter both are abbreviated as PLA.

Recent concerns about global warming have led to a search for more environmentally benign and sustainable materials that could substitute and/or improve upon the performance of the more commonly used petroleum-based materials. Thus, PLA derived from annually renewable resources is one of the most promising and practical materials for the partial replacement of the petroleum-based materials. Our present patent offers the synthetic method for the above-mentioned more environmentally friendly PLA.

BACKGROUND ART

Commercially available polylactide at present is mostly poly(L-lactide) (hereinafter referred to as PLLA) and is synthesized from L-lactic acid with high optical purity obtained by the fermentation of a farm product (for example, starch). In order to synthesize PLLA from L-lactic acid, a method in which first L-lactide (hereinafter referred to as LLA) which is a cyclic dimer of L-lactic acid is synthesized, followed by the ring-opening polymerization of LLA as shown in the following chemical formula is generally used (Patent Literature 1). In order to synthesize crystalline PLLA, the optical purity of LLA to be used as a starting material is crucial. PLLA acquires a crystalline structure in which the PLLA molecules are regularly arranged. However, it is known that polylactides (PLA) synthesized from LLA with ≥8% of D-lactide (DLA) and/or meso-lactide, which are an optical isomers of LLA, are amorphous because the PLA molecules cannot be regularly arranged (Non Patent Literature 1).

[Chem. 1]

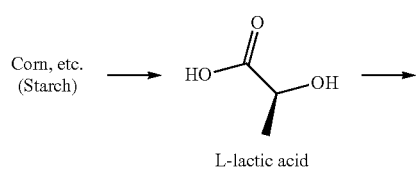

L-lactic acid

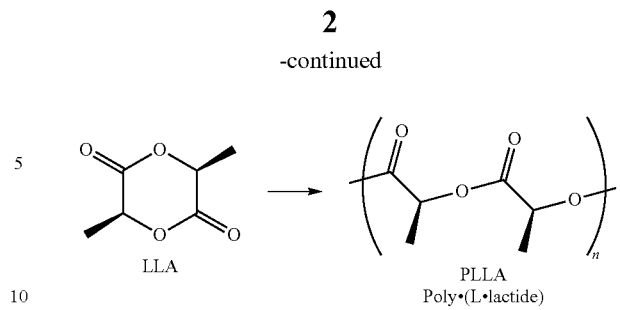

In contrast, there is a known method in which semi-crystalline PLA is synthesized by the polymerization of a mixture of equivalent amounts of LLA and DLA, in other words, racemic lactide (rac-LA) with a stereoselective salen-aluminum catalyst. One example of the stereoselective salen-aluminum catalyst is shown in the following formula. In the formula, R is a bulky substituent such as a phenyl group, a tert-butyl group, or a tert-butyldimethylsilyl group.

[Chem. 2]

The stereoselective mechanism of the catalyst is shown in the following chemical formula. The catalyst which is first coupled to LLA selectively activates LLA after coupled thereto and permits the ring-opening polymerization thereof, whereby a poly(L-lactide)-block (PLLA-block) is grown. On the other hand, the catalyst which is first coupled to DLA selectively activates DLA after coupled thereto and permits the ring-opening polymerization thereof, whereby a poly(D-lactide)-block (PDLA-block) is grown. The salen-aluminum catalyst can selectively polymerize LLA and DLA in this manner, and therefore, the resulting poly(racemic lactide) is composed of PLLA blocks and PDLA blocks. The poly(racemic lactide) obtained by this method acquires a semi-crystalline structure by forming a stereocomplex in which the poly(racemic lactide) molecules are regularly arranged (Patent Literature 2).

[Chem. 3]
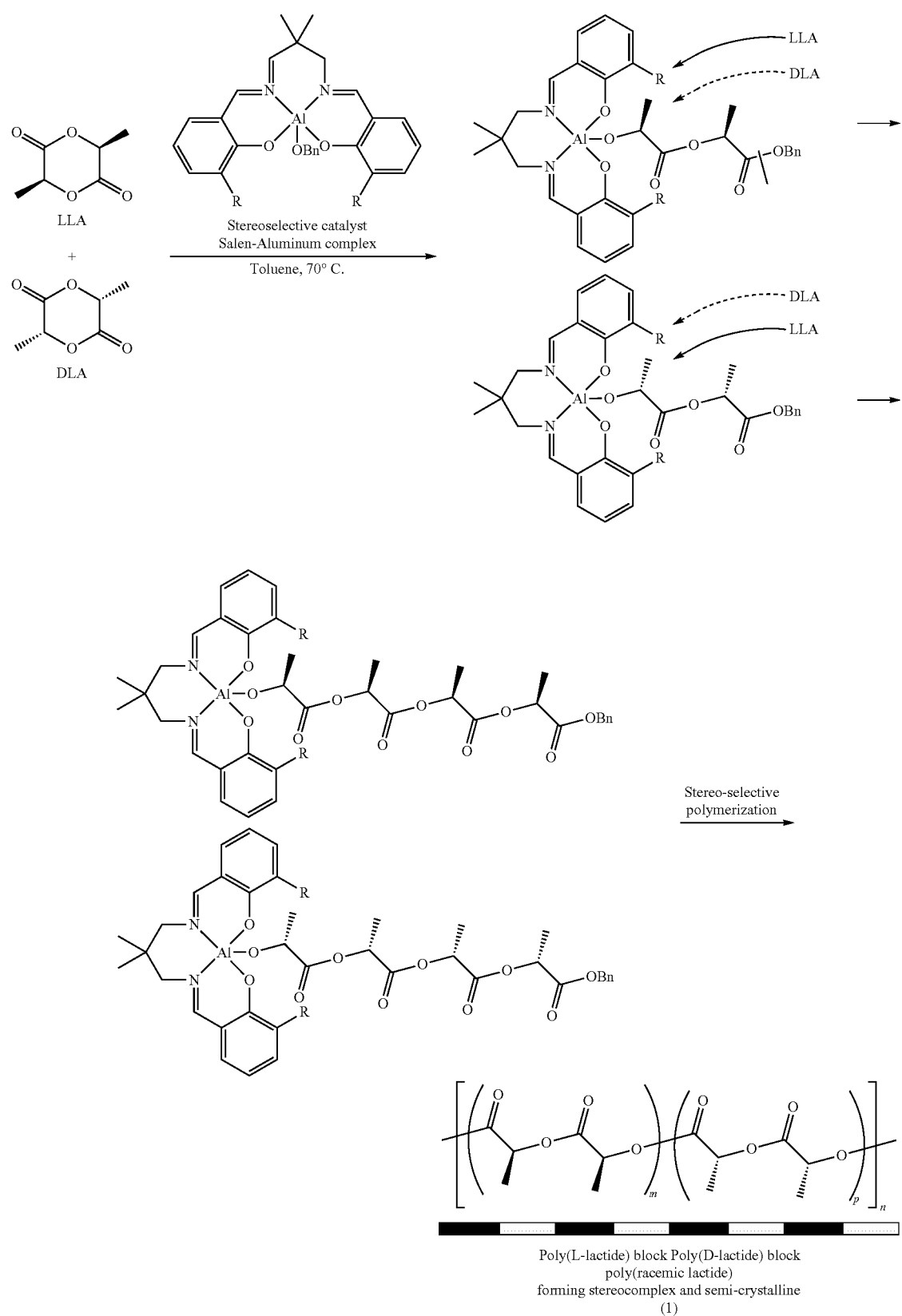
Poly(L-lactide) block Poly(D-lactide) block poly(racemic lactide)
forming stereocomplex and semi-crystalline
(1)

As the isomers of lactide, other than LLA and DLA, there is also meso-lactide (meso-LA). The salen-aluminum catalyst can selectively polymerize LLA and DLA, however the ability of the salen-aluminum catalyst to selectively polymerize a LLA, DLA, and meso-LA mixture is not high. For this reason, even if the salen-aluminum catalyst as shown in the patent shown previously (Patent Literature 2) is used, PLA obtained from a mixture of rac-LA and meso-LA is a polylactide resulting from the random polymerization of LLA, DLA, and meso-LA. In such polylactide, the polylactide molecules are not regularly arranged and a stereocomplex cannot be formed, and therefore semi-crystalline PLA cannot be obtained.

CITATION LIST

Patent Literature

PTL1: U.S. Pat. No. 2,703,316
PTL2: JP-A-2003-64174

Non Patent Literature

NPL1: Shimadzu-hyoron, 56, 163, 1999

SUMMARY OF INVENTION

Technical Problem

The invention has been made in view of the above circumstances, and an object of the invention is to provide a method for synthesizing semi-crystalline polylactides (PLA) even from a lactide mixture including meso-LA and rac-LA.

Solution to Problem

To solve the above-mentioned subjects, we researched and found out the synthetic protocol for semi-crystalline PLA from a mixture of rac-LA and meso-LA. The following Chemical formula shows the scheme to produce PLA from a mixture of rac-LA and meso-LA.

The ratio of the polymerization rate constants of meso-LA and rac-LA was k (meso-LA)/k (rac-LA)=2.7 and is not high enough, so rac-LA and meso-LA should be separated by taking advantage of a difference in physicochemical properties therebetween. Only meso-LA is preferentially polymerized in the first stage to form a poly(meso-LA) block, and in the subsequent stage, rac-LA is polymerized to form a poly(rac-LA) block. Although the poly(meso-LA) block formed in the first stage is amorphous, the poly(rac-LA) block formed in the latter stage is semi-crystalline. The obtained PLA as a whole is semi-crystalline.

[Chem. 4]

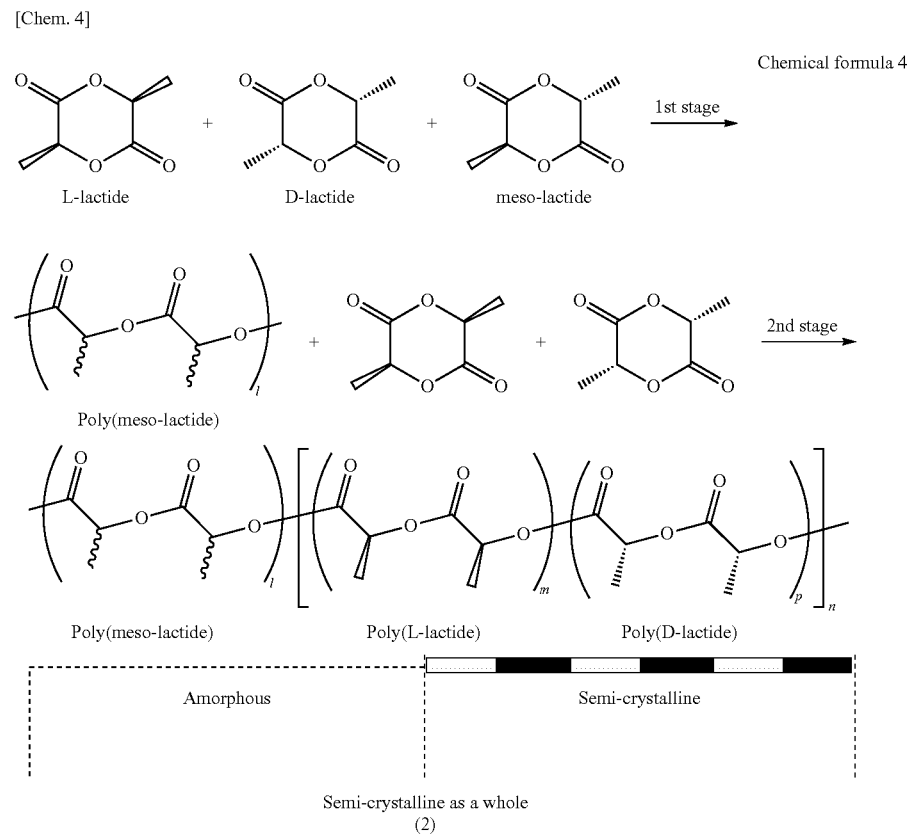

Here, the definitions of the above-described respective terms to be used also in the following description will be described.

The "lactide" refers to a cyclic compound formed by the dehydration-condensation of two lactic acid molecules between a hydroxyl group of one molecule and a carboxyl group of the other molecule. Each lactic acid molecule has one asymmetric carbon, and there are two optical isomers, namely, L-lactic acid and D-lactic acid. Therefore, in lactide, there are three isomers, namely, L-lactide, D-lactide, and meso-lactide.

The "L-lactide (LLA)" is a cyclic compound formed by the dehydration-condensation of two L-lactic acid molecules.

The "D-lactide (DLA)" is a cyclic compound formed by the dehydration-condensation of two D-lactic acid molecules.

The "meso-lactide (meso-LA)" is a cyclic compound formed by the dehydration-condensation of one L-lactic acid molecule and one D-lactic acid molecule.

The "racemic lactide (rac-LA)" is a substance which is an equimolar mixture of L-lactide and D-lactide and has a melting point of about 127° C., which is higher than that of LLA or DLA.

The "polylactide (PLA)" is synonymous with poly(lactic acid) (PLA). A polymer obtained by the polymerization of LLA is expressed as poly(L-lactide) (PLLA), a polymer obtained by the polymerization of DLA is expressed as poly (D-lactide) (PDLA), a polymer obtained by the polymerization of meso-LA is expressed as poly(meso-LA), and a polymer obtained by the polymerization of rac-LA is expressed as poly(rac-LA).

In this invention, a "semi-crystalline PLA" is defined as a crystallizable polymer composition having a melting point greater than 140° C. and a heat of crystallization greater than 5 J/g.

In this invention, the "semi-crystalline PLA" is a multi-block stereocopolymer composed of a PLLA block and a PDLA block, and the L-block and D-block should each have at least 5 lactyl units. The semi-crystalline PLA has a heat of fusion of 5 J/g or more and a melting point of 140° C. or higher.

A stereoselective catalyst is capable of producing a semi-crystalline polymer having a melting point greater than 140° C. and which, upon complete hydrolysis, yields 50% of L-lactic acid equivalents and 50% of D-lactic acid equivalents.

The "stereoselective polymerization" which is used in the invention refers to the selective polymerization of LLA and DLA with a catalyst such as a salen-aluminum catalyst, thereby forming a semi-crystalline multiblock stereocopolymer composed of a PLLA block and a PDLA block.

The "separate polymerization" which is used in the invention refers to the separate polymerization of meso-LA and rac-LA by taking advantage of a difference in physicochemical properties therebetween.

As for the method to produce the semi-crystalline poly (lactic acid) by taking advantage of a difference in physico-chemical properties between meso-LA and rac-LA as described above, there are the following two methods.

(1) rac-LA and meso-LA are separated using the difference in the solubility to a solvent. To a mixture of meso-LA and rac-LA, a small amount of a solvent is added, and meso-LA having a high solubility is preferentially dissolved in the solvent, whereby meso-LA in the mixture is polymerized first. Thereafter, rac-LA is polymerized. rac-LA polymerizes in semi-crystalline PLA using stereoselective catalyst.

(2) rac-LA and meso-LA are separated using the difference in the melting point. A mixture of meso-LA and rac-LA is heated to a temperature at which meso-LA having a lower melting point melts, and meso-LA in the mixture is polymerized first. Thereafter, the mixture is heated to a temperature at which rac-LA melts and rac-LA is polymerized. rac-LA polymerizes in semi-crystalline PLA using stereoselective catalyst.

As the catalyst to be used in the polymerization in the above method, a catalyst having a bulky substituent is used, and therefore, stereocomplex-type poly(rac-LA) composed of PLLA blocks and PDLA blocks is formed by the stereoselective polymerization of rac-LA. The examples of the catalyst include catalysts containing a salen-type metal as described in JP-A-2003-64174, and more specifically include catalysts containing a salen-type metal having a structure shown below. In the formula, M represents a metal selected from Al, Fe, V, and Ti; and R1 and R2, which may be the same or different, represent hydrogen or a bulky substituent such as a phenyl group, a tert-butyl group, a trimethylsilyl group, or a tert-butyldimethylsilyl group.

[Chem. 5]

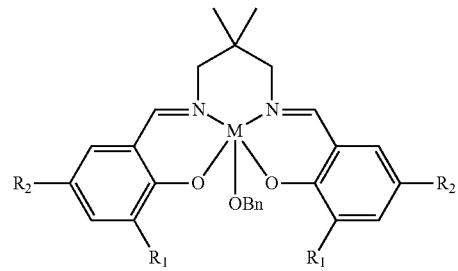

Examples of the mixture of rac-LA and meso-LA include a product derived from glycerol. Recently, it has been reported that glycerol can be converted into racemic lactic acid by the reaction of glycerol with sodium hydroxide in high-temperature and high-pressure water at 300° C. (WO 2007/0010431). Glycerol is formed in a large amount as a byproduct when biodiesel fuel is produced. The biodiesel fuel is produced by mainly using a vegetable fat or oil as a starting material, and the production amount thereof has increased recently. From this racemic lactic acid synthesized from glycerol, a mixture of LLA, DLA, and meso-LA with the ratio of about 30:30:40 to 33:33:33 (LLA:DLA:meso-LA) is synthesized. Therefore, with the use of the method of the invention, semi-crystalline polylactide can be efficiently synthesized from a mixture of lactide isomers synthesized from glycerol.

Also, a mixture of LLA, DLA, and meso-LA formed by the epimerization of meso-LA may be used as a starting material for the method of the invention. It has been reported that the epimerization of meso-LA caused by a treatment with a base provides meso-LA, LLA, and DLA (Tetrahedron Letter 52 (2011), 1027-1030. WO2010/105142). Therefore, if a mixture of meso-LA and rac-LA is formed from meso-LA by the above-described treatment with a base, semi-crystalline polylactide can be synthesized by using meso-LA as a starting material according to the method of the invention.

Advantageous Effects of Invention

According to the method of the invention, even if a lactide monomer is a mixture of rac-LA and meso-LA, semi-crystalline PLA can be produced.

DESCRIPTION OF EMBODIMENTS

Figure 1:
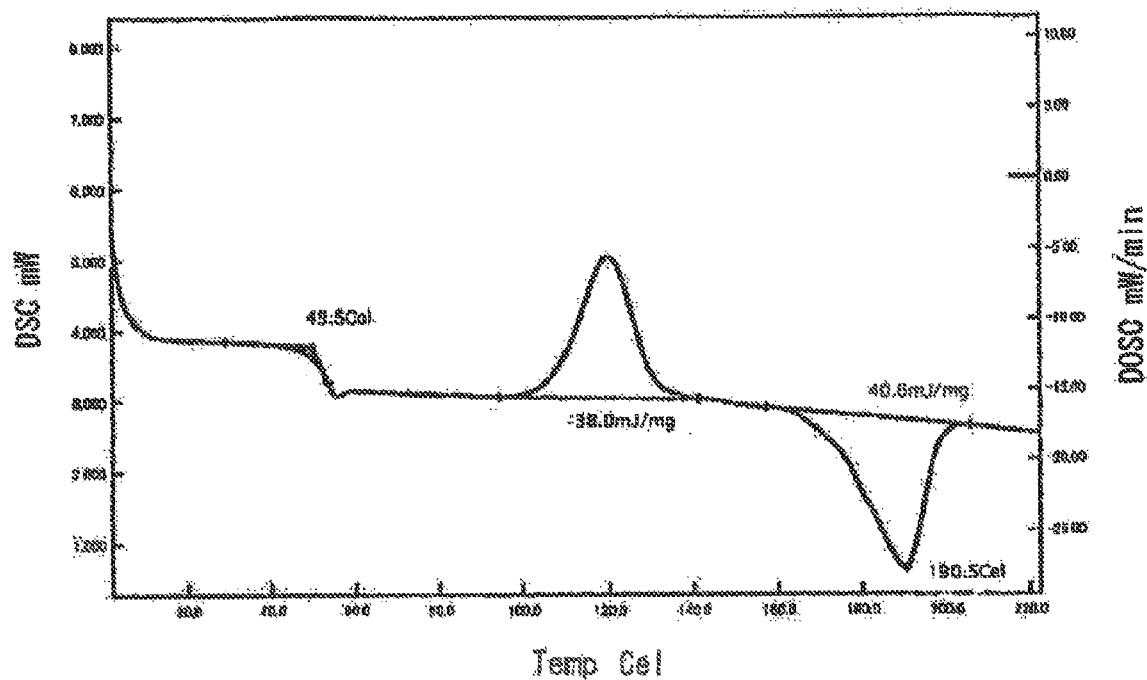
FIG. 1 is a DSC thermal analysis chart of PLA obtained in Example 1.

Hereinafter, the method for producing semi-crystalline polylactide of the invention will be specifically described.

Embodiment 1

As embodiment 1, a method which takes advantage of a difference in solubility between rac-LA and meso-LA will be described.

The rac-LA and meso-LA are in a diastereomeric relationship and have different solubilities in many solvents. In particular, meso-LA shows higher solubility than rac-LA in many solvents, and meso-LA is polymerized first, followed by rac-LA to afford the crystalline PLA with PLLA- and PDLA-blocks. As a result, semi-crystalline PLA could be obtained.

As the solvent, any solvent can be used as long as a difference in solubility therebetween is caused. However, in consideration of a reaction temperature during polymerization, a solvent having a relatively high boiling point, for example, a hydrocarbon such as toluene or octane; ether such as dibutyl ether; or a ketone such as methyl ethyl ketone or cyclohexanone can be used.

In the case of a toluene solvent, solubility of meso-LA is larger than rac-LA. In order to carry out separation polymerization of meso-LA and rac-LA, the ratio of lactide to the solvent is preferably high. Although meso-LA dissolves completely or partially, rac-LA slightly dissolves. Therefore, the ratio thereof is, for example, preferably more than 2 mmol/mL and 50 mmol/mL or less, more preferably from 4 mmol/mL to 20 mmol/mL.

In the polymerization, a catalyst having a bulky substituent is used for the selective polymerization to form PLLA blocks and PDLA blocks, and examples thereof include catalysts containing a salen-type metal and more specifically include catalysts containing a salen-type metal having a structure shown below.

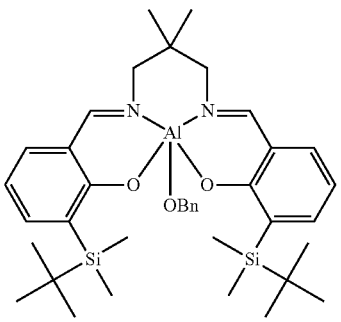

[Chem. 6]

The time required for the polymerization is from 0.5 to 60 hours, and the reaction temperature is from 50 to 100° C.

Example 1

The ring-opening polymerization was performed in the presence of a salen-aluminum catalyst shown above under the condition that the addition of a mixture of rac-LA and meso-LA relative to the amount of a toluene solvent was intentionally increased.

To a mixture of rac-LA and meso-LA in a toluene solvent (rac-LA: 0.67 mmol, meso-LA: 0.33 mmol, toluene: 0.125 mL) in a test tube subjected to nitrogen replacement at room temperature, a catalyst in a toluene solvent (catalyst: 0.01 mmol, toluene: 0.125 mL) was added, and the resulting mixture was heated to 70° C. After a reaction was allowed to proceed for 21 hours, the reaction mixture was cooled to room temperature and dissolved in chloroform (1.75 mL). Thereafter, the resulting crude PLA solution in chloroform-toluene was purified by precipitation in chilled methanol (60 mL), whereby PLA was obtained.

At this time, the addition of lactide relative to the amount of toluene was 4 mmol (lactide) per milliliter of toluene, however, most of rac-LA was not dissolved, and therefore, the value is different from the "concentration" in a general sense. The molar ratio of lactide to the catalyst was 100 mol/mol.

Example 2

The procedure was performed in the same manner as in Example 1 except that the addition of lactide relative to the amount of toluene was changed to 8 mmol/mL.

Example 3

The procedure was performed in the same manner as in Example 1 except that the composition of the catalyst-toluene mixture was changed such that the amounts of the catalyst and toluene were 0.02 mmol and 0.125 mL, respectively, the composition of the lactide-toluene mixture was changed such that the amounts of rac-LA, meso-LA, and toluene were 1.34 mmol, 0.66 mmol, and 0.125 mL, respectively, and the addition of lactide relative to the amount of toluene was changed to 16 mmol/mL.

Example 4

The procedure was performed in the same manner as in Example 3 except that the ratio of rac-LA to meso-LA was changed to 60 to 40. The amounts of rac-LA and meso-LA were 1.2 mmol and 0.8 mmol, respectively.

Example 5

The procedure was performed in the same manner as in Example 2 except that the composition of the lactide mixture was changed that the amounts of rac-LA, meso-LA, LLA were 0.80 mmol, 2.56 mmol and 0.64 mmol, respectively.

Reference Example 1

Lactide composed only of rac-LA was used, and this lactide was dissolved in toluene so that the addition of lactide relative to the amount of toluene was 1 mmol/mL. And the molar ratio of lactide to the catalyst was 100 mol/mol. At this time, the composition of the catalyst-toluene solution was such that the amounts of the catalyst and toluene were 0.02 mmol and 1.0 mL, respectively, and the composition of the lactide-toluene solution was such that the amounts of rac-LA and toluene were 2.0 mmol and 1.0 mL, respectively. The reaction time was set to 20 hours. Reference Example 1 corresponds to a method in accordance with the method described in JP-A-2003-64174 was used.

Reference Example 2

The procedure was performed in the same manner as in Reference Example 1 except that lactide composed only of meso-LA was used. At this time, the composition of the catalyst-toluene solution was such that the amounts of the catalyst and toluene were 0.02 mmol and 1.0 mL, respectively, and the composition of the lactide-toluene solution was such that the amounts of meso-LA and toluene were 2.0 mmol and 1.0 mL, respectively. The reaction time was set to 10 hours.

Comparative Example 1

The procedure was performed in the same manner as in Example 1 except that a mixture of rac-LA and meso-LA (rac-LA:meso-LA=67:33) was dissolved in toluene so that the addition of lactide relative to the amount of toluene was 1 mmol/mL. At this time, the composition of the catalyst-toluene solution was such that the amounts of the catalyst and toluene were 0.02 mmol and 1.0 mL, respectively, and the composition of the lactide-toluene solution was such that the amounts of rac-LA, meso-LA, and toluene were 1.34 mmol, 0.66 mmol, and 1.0 mL, respectively.

Comparative Example 2

The procedure was performed in the same manner as in Example 1 except that a mixture of rac-LA and meso-LA (rac-LA:meso-LA=67:33) was dissolved in toluene so that the addition of lactide relative to the amount of toluene was 2 mmol/mL. At this time, the composition of the catalyst-toluene solution was such that the amounts of the catalyst and toluene were 0.01 mmol and 0.25 mL, respectively, and the composition of the lactide-toluene mixture was such that the amounts of rac-LA, meso-LA, and toluene were 0.67 mmol, 0.33 mmol, and 0.25 mL, respectively.

Results

The polymerization conditions and the results for Examples 1 to 4, Reference Examples 1 and 2, and Comparative Examples 1 and 2 are summarized in Table 1.

TABLE 1

| | Conditions | | | | | Results | | | |
|---|---|---|---|---|---|---|---|---|---|
| | [M][a] | | | | | | | | |
| | rac:meso:L mol:mol:mol | [M]/[cat][a] mol/mol | monomer (mmol) toluene (ml) | Temp. °C. | Time h | Conv.[b] mol % | $M_n$[c] — | $T_m$[d] °C. | $dH_{fus}$[d] J/g |
| reference example 1 | 100:0:0 | 100 | 1 | 70 | 20 | 93 | 21,900 | 207 | 57.2 |
| reference example 2 | 0:100:0 | 100 | 1 | 70 | 10 | 89 | 12,900 | — | — |
| comparative example 1 | 67:33:0 | 100 | 1 | 70 | 21 | 93 | 11,800 | — | — |
| comparative example 2 | 67:33:0 | 100 | 2 | 70 | 21 | 98 | 15,100 | 179 | 1.38 |
| example 1 | 67:33:0 | 100 | 4 | 70 | 21 | 98 | 12,500 | 181 | 41.7 |
| example 2 | 67:33:0 | 100 | 8 | 70 | 21 | 96 | 18,900 | 191 | 40.6 |
| example 3 | 67:33:0 | 100 | 16 | 70 | 21 | 97 | 20,400 | 190 | 41.2 |
| example 4 | 60:40:0 | 100 | 8 | 70 | 21 | 99 | 21,200 | 183 | 23.9 |
| example 5 | 64:20:16 | 100 | 8 | 70 | 21 | 100 | 20,000 | 192 | 50.3 |

The polymerizations were performed under N2 in toluene under the following conditions
[a]rac:meso; mole ratios of rac-LA/meso-LA [M]; monomer (mmol)/toluene (ml), [M]/[cat]; mole ratios of monomer/catalyst
[b]monomer conversion; the prepurified reaction solution was analyzed with 300 MHz 1H NMR and calculated.
[c]number average molecular weigh; the polymer obtained after purification was analyzed with SEC and calculated. Polystyrene in chloroform was used as the reference material.
[d]Tm: melting point. Δ Hfus: heat of fusion. The polymers after purification were analyzed with DSC.

In Reference Example 1 in which the polymerization of only rac-LA was performed, the monomer conversion was 93% and the number average molecular weight reached 21,900. In addition, the PLA obtained in Reference Example 1 forms a so-called stereocomplex-type crystalline structure, and therefore has a higher melting point (207° C.) than the melting point of PLLA (175° C.) synthesized from optically active L-lactic acid.

In Reference Example 2 in which the polymerization of only meso-LA was performed, the monomer conversion of the obtained PLA was about 90% and the number average molecular weight thereof reached 12,900, however, the PLA is an amorphous polymer which does not have a melting point or a heat of fusion.

In Examples 1 to 4 in which the amount of lactide relative to the amount of toluene was intentionally increased, semi-crystalline PLA was obtained in each Example, and as the amount of lactide relative to the amount of toluene was increased, the melting point and the heat of fusion of the obtained PLA increased, and when the amount of lactide relative to the amount of toluene was 16 mmol/mL (Example 3), the melting point of the PLA reached 190° C., which is higher than the melting point of PLLA synthesized from optically active L-lactic acid.

On the other hand, in Comparative Examples 1 and 2 in which the amount of lactide relative to the amount of toluene was 2 mmol/mL or less, which is lower than in Examples 1 to 4, an amorphous polymer which does not have a melting point or a heat of fusion was obtained (in Comparative Example 2, the obtained polymer has a heat of fusion of 1.38 J/g, however, the value is lower than 5 J/g, and therefore, the obtained polymer is regarded as an amorphous polymer). The selectivity of the catalyst among LLA, DLA, and meso-LA is not high under the conditions that the amount of lactide relative to the amount of toluene is low, and both of rac-LA and meso-LA are dissolved in toluene, and therefore, a stereocomplex composed of a PLLA blocks and a PDLA blocks cannot be formed. Consequently, semi-crystalline polylactide could not be obtained.

As described above, by intentionally increasing the amount of lactide relative to the amount of toluene, semi-crystalline PLA could be synthesized even from a mixture of rac-LA and meso-LA.

In Example 4, it was shown that even if the ratio of meso-LA is increased to 40%, semi-crystalline PLA can be obtained.

Figure 2:
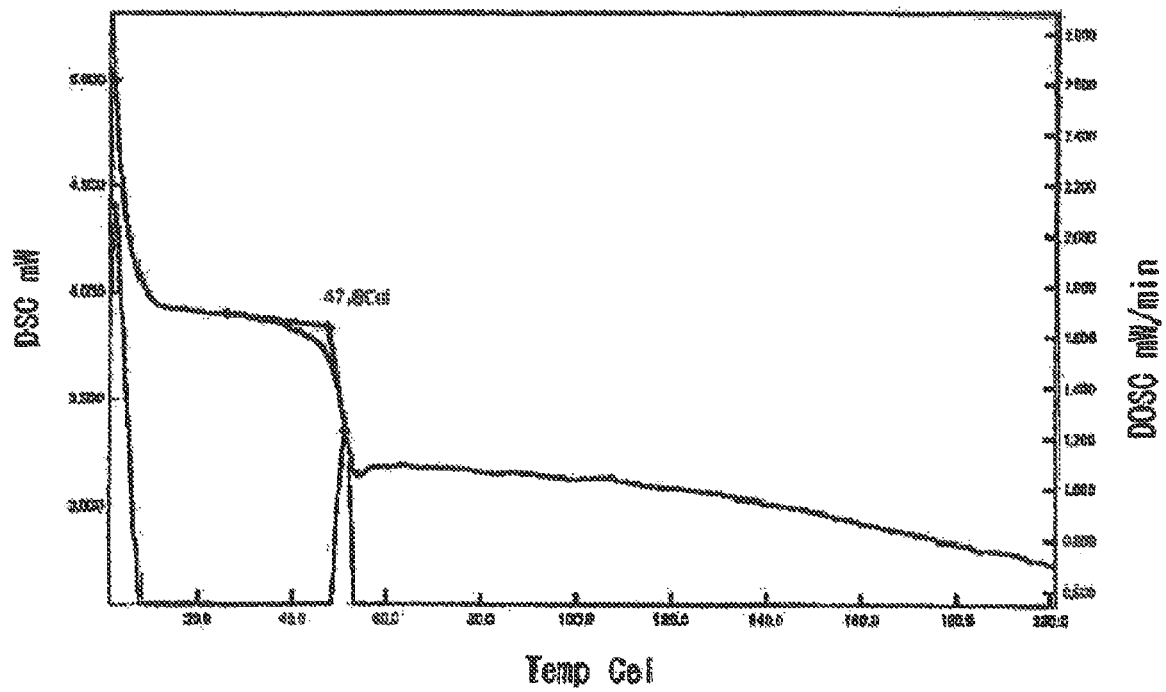
FIG. 2 is a DSC thermal analysis chart of PLA obtained in Comparative Example 1.

FIGS. 1 and 2 show DSC thermal analysis charts (the data obtained at the time of the second temperature elevation after the temperature was elevated to 230° C. at 10° C./min, and then decreased rapidly) of the PLA products obtained in Example 2 and Comparative Example 1, respectively.

Production Process of Molecular Structure of PLA Obtained

In order to study the molecular structure of PLA obtained by the method of the invention and the production process thereof, under the polymerization conditions in Example 2, changes in residual ratios of rac-LA and meso-LA over time in the polymerization process and the 1H-NMR spectrum of PLA in the production process were observed.

Comparative Example 3

The polymerization conditions were set to the same as in Example 2 except that the reaction time was changed to 1 hour, and the reaction was performed. Then, the reaction mixture was cooled to room temperature, and chloroform (1.75 mL) was added to the mixture. Thereafter, crude PLA in chlorodorm-toluene was purified by precipitated in chilled methanol (60 mL).

Comparative Example 4

The procedure was performed in the same manner as in Comparative Example 3 except that the reaction time was changed to 2 hours.

Comparative Example 5

The procedure was performed in the same manner as in Comparative Example 3 except that the reaction time was changed to 4 hours.

Example 6

The procedure was performed in the same manner as in Comparative Example 3 except that the reaction time was changed to 10 hours.

Molecular Structure of PLA Obtained

Figure 3:
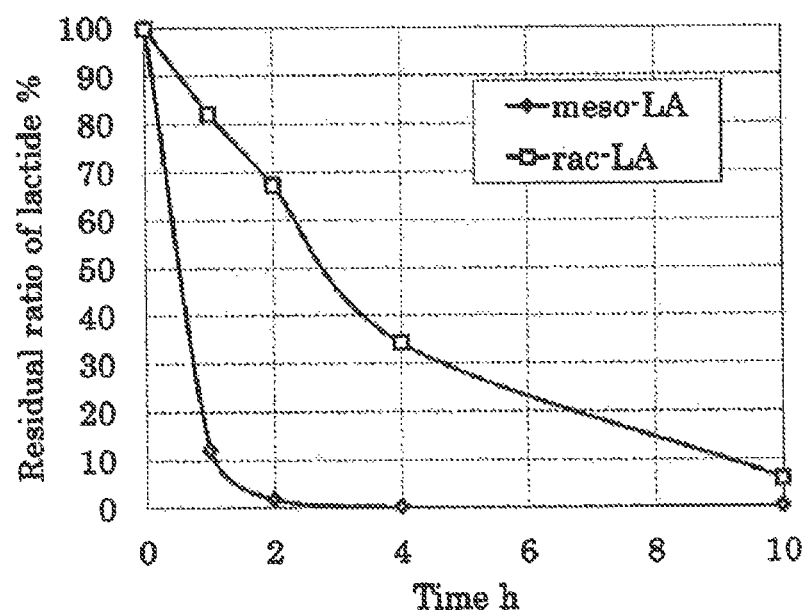
FIG. 3 is a graph showing a change in residual ratio of lactide over time in a polymerization process.

With respect to Comparative Examples 3 to 5 and Example 6, changes in monomer conversions of PLA products over time in the polymerization process are shown in Table 2. Further, changes in residual ratios of rac-LA and meso-LA over time in the polymerization process are shown in FIG. 3.

TABLE 2

| | Conditions | | | | Results | | | | Residual ratio | |
| | [M][a] | | | | | | | | | |
| | rac:meso mol:mol | monomer (mmol) toluene (ml) | Temp. ° C. | Time h | Conv.[b] mol % | $M_n$[c] | $T_m$[d] ° C. | $dH_{fus}$[d] J/g | meso-LA % | rac-LA % |
|---|---|---|---|---|---|---|---|---|---|---|
| starting material | 67:33 | 8 | room temp. | 0 | 0 | — | — | — | 100 | 100 |
| comparative example 3 | 67:33 | 8 | 70 | 1 | 41 | 8,770 | — | — | 12 | 82 |
| comparative example 4 | 67:33 | 8 | 70 | 2 | 54 | 11,500 | — | — | 2 | 67 |
| comparative example 5 | 67:33 | 8 | 70 | 4 | 77 | 15,600 | — | — | 0 | 34 |
| example 6 | 67:33 | 8 | 70 | 10 | 95 | 21,400 | 188 | 39.3 | 0 | 6 |

[a]rac:meso mole ratios of rac-LA/meso LA [M]; monomer (mmol)/toluene (ml), [M]/[cat]; mole ratios of monomer/catalyst
[b]monomer conversion; the prepurified reaction solution was analyzed with 300 MHz 1H NMR and calculated.
[c]number average molecular weigh; the polymer obtained after purification was analyzed with SEC and calculated. Polystyrene in chloroform was used as the reference material.
[d]Tm: melting point, dHfus: heat of fusion. The polymers after purification were analyzedwith DSC. (The temperature was elevated twice.)

Table 2 shows that the monomer conversion and the number average molecular weight increased over time, and after 10 hours, the monomer conversion reached 95% and the number average molecular weight reached 21,400. Further, PLA obtained up to 4 hours of the reaction time was an amorphous polymer which did not have a melting point or a heat of fusion, however, PLA obtained after 10 hours was a semi-crystalline polymer which had a melting point of 188° C. and a heat of fusion of 39.3 J/g.

FIG. 3 shows the time course of the monomer conversions of rac- and meso-LA. In the early stage of the polymerization, mesa-LA was preferentially consumed, and after 2 hours, most of meso-LA was consumed although 67% of rac-LA remained. On the other hand, rac-LA, 67% of which remained after 2 hours, was mostly consumed after 10 hours.

In this manner, by intentionally increasing the amount of lactide relative to the amount of toluene, rac-LA and meso-LA could be polymerized separately. That is, in the early stage of the polymerization, meso-LA having a high solubility could be preferentially polymerized, and in the latter stage, rac-LA having a low solubility could be polymerized.

Figure 4:
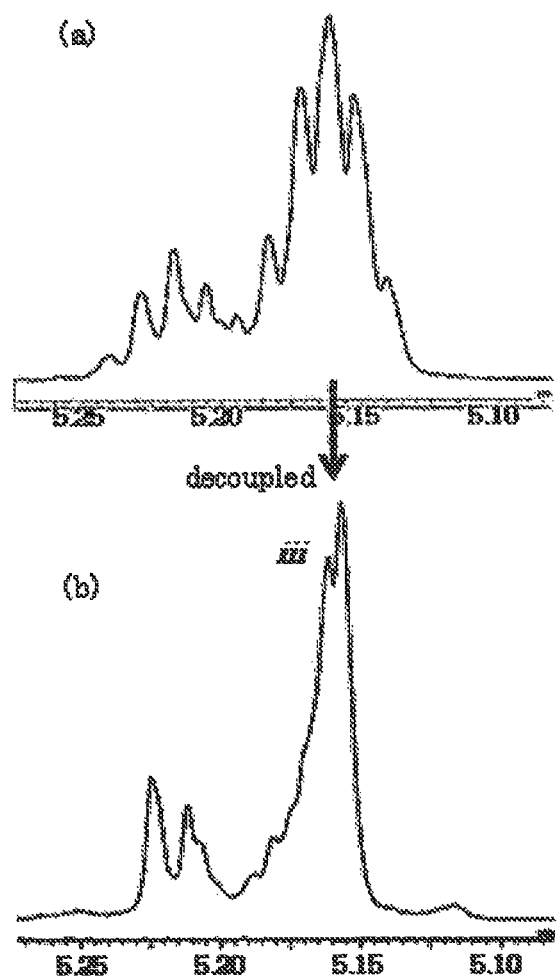
FIG. 4(a) shows the 1H-NMR spectrum of the methine group of PLA obtained in Comparative Example 3, and FIG. 4 (b) shows the same through decoupling measurement.
Figure 5:
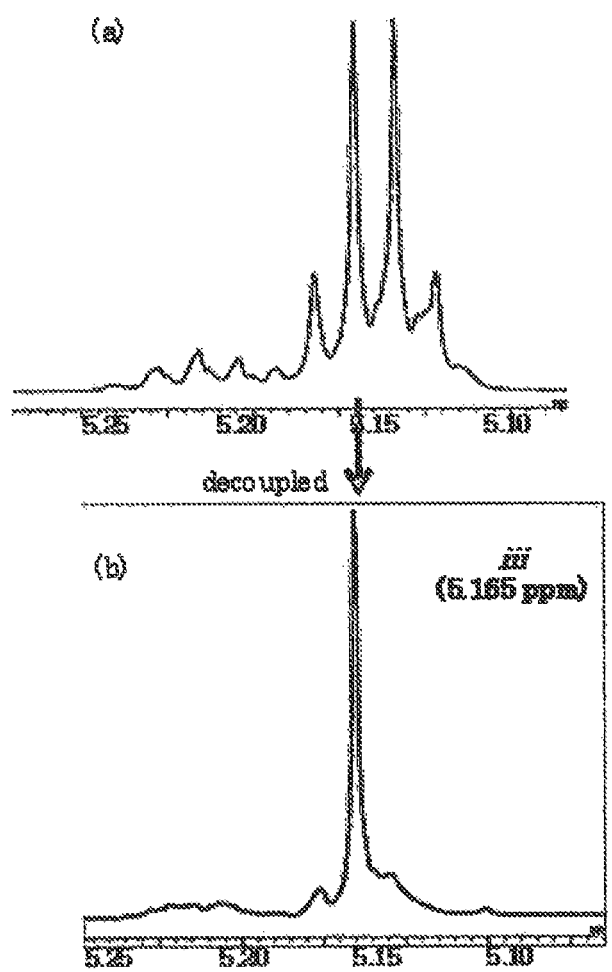
FIG. 5(a) shows the 1H-NMR spectrum of the methine group of PLA obtained in Example 6.
FIG. 5(b) shows the same through decoupling measurement.

In order to study the molecular structures of the PLA products obtained in Comparative Example 3 and Example 6, the 1H-NMR spectrum of the methine group and the 1H-NMR spectrum of the methine group through decoupling measurement by the irradiation of the methyl group are shown in FIGS. 4 and 5.

According to FIG. 4 (a), a plurality of peaks are observed in the 1H-NMR spectrum of the methine group. In the decoupling measurement of the methine group shown in FIG. 4 (b), it is found from the respective peaks that the stereoselectivity is low and the iii peak is minor.

From these results, it is found that an amorphous poly (meso-LA) block is synthesized by the preferential polymerization of meso-LA in the early stage of the polymerization.

On the other hand, according to FIG. 5 (a), in the 1H-NMR spectrum of the methine group, a clear quartet is observed. In the decoupling measurement of the methine group shown in FIG. 5(b), the iii peak (at 5.165 ppm) which has high stereoselectivity becomes sharp and high.

From these results, it is found that a poly(rac-LA) block having high isoselectivity is synthesized by the stereoselective polymerization of rac-LA in the latter stage.

Figure 6:
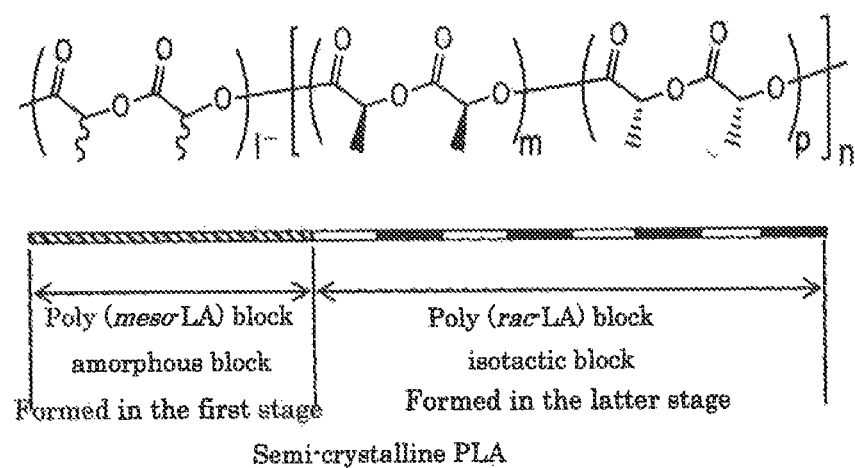
FIG. 6 is a view, showing the molecular structure of PLA obtained.

From the above results, polylactide which is semi-crystalline as a whole is successfully obtained by forming an amorphous poly(meso-LA) block and a semi-crystalline poly(rac-LA) block as shown in FIG. 6.

Embodiment 2

In embodiment 2, a method for synthesizing semi-crystalline PLA by bulk polymerization through the ring-opening polymerization of lactide in a molten state will be described.

As a conventional method, a method for synthesizing semi-crystalline PLA by bulk polymerization using only rac-LA as a starting material with a salen-aluminum catalyst having stereoselectivity (in other words, capable of selecting between LLA and DLA) has been reported (Polymer Journal, vol. 36, No. 3, pp. 261-264 (2004)). However, when the starting material contained meso-LA, since the salen-aluminum catalyst has a low ability to select between LLA and meso-LA or between DLA and meso-LA, PLLA blocks and PDLA blocks could not be formed, because the salen-aluminum catalyst has a low ability to select between rac-LA and meso-LA. Therefore, semi-crystalline PLA could not be synthesized.

In embodiment 2, by focusing attention on a difference in melting point between rac-LA and meso-LA, rac-LA and meso-LA were separately polymerized and semi-crystalline PLA was successfully obtained.

As the catalyst to be used in the polymerization, a catalyst having a bulky substituent is used, so that stereocomplex-type PLA composed of poly(LLA) blocks and poly(DLA) blocks can be formed by the stereoselective polymerization of rac-LA, and examples of the catalyst include catalysts containing a salen-type metal and specifically include catalysts containing a salen-type metal having a structure shown above.

The heating temperature in the first stage is 50° C. or higher and 130° C. or lower (a temperature range in which meso-LA melts, but rac-LA hardly melts), and the heating temperature in the second stage is 55° C. or higher and 250° C. or lower and is higher than the temperature in the first stage. Pure rac-LA melts at a temperature of 130° C. or higher, but a mixture of rac-LA with meso-LA melts at a lower temperature. Therefore, it is effective to set the heating temperature in the second stage to a temperature lower than the melting point of PLLA (175° C.). However, if the temperature exceeds 250° C., rac-LA may be thermally decomposed, and therefore, a heating temperature exceeding 250° C. is not preferred. The polymerization time required for each stage is from 0.5 to 60 hours.

Example 7

To a test tube subjected to nitrogen replacement, 3.0 mmol of lactide with a composition of rac-LA:meso-LA=90:10 and the same salen-aluminum catalyst used at embodiment 1, the molar amount of which is 1/300 the molar amount of the lactide, are added. A reaction is initiated by heating without using a solvent, and PLA is synthesized by the ring-opening polymerization of the lactide in a molten state. The heating is performed in two stages, more specifically, the reaction is performed at 50° C. for 6 hours first, and thereafter, the reaction is performed at 130° C. for 2 hours.

After completion of the reaction, the reaction product was cooled to room temperature and dissolved in chloroform. Then, the reaction product was purified by recrystallization in 150 mL of chilled methanol.

Example 8

The procedure was performed in the same manner as in Example 7 except that the heating temperature in the first stage was changed to 60° C. for 4 hours.

Example 9

The procedure was performed in the same manner as in Example 7 except that the heating temperature in the first stage was changed to 70° C. for 2 hours.

Example 10

The procedure was performed in the same manner as in Example 7 except that the heating temperature in the first stage was changed to 90° C. for 1 hour and the heating temperature in the second stage was changed to 130° C. for 3 hours.

Example 11

The procedure was performed in the same manner as in Example 9 except that the heating temperature in the second stage was changed to 110° C. for 12 hours.

Example 12

The procedure was performed in the same manner as in Example 9 except that the ratio of rac-LA to meso-LA was changed to 80:20 and the heating temperature in the first stage was changed to 70° C. for 3.5 hours.

Reference Example 3

The bulk polymerization of lactide composed only of rac-LA was performed. The heating was performed in one stage at 130° C. for 2 hours. As the catalyst, the same salen-aluminum catalyst as used in Example 1 was used, and the molar ratio of the lactide to the catalyst was 1000 mol/mol, Comparative Example 6

The ratio of rac-LA to meso-LA in the lactide mixture was set to 80:20, and the bulk polymerization of the mixture was performed. The heating was performed in one stage at 130° C. for 3 hours. The molar ratio of the lactide to the catalyst was 300 mol/mol.

Comparative Example 7

The ratio of rac-LA to meso-LA in the lactide mixture was set to 90:10, and the bulk polymerization of the mixture was performed. The heating was performed in one stage at 130° C. for 3 hours. The molar ratio of the lactide to the catalyst was 300 mol/mol.

Results

The results are summarized in Table 3.

TABLE 3

|  | Conditions | | | | Results | | | |
| --- | --- | --- | --- | --- | --- | --- | --- | --- |
|  | rac:meso mol:mol | [M]/[cat][a] mol/mol | 1st step | 2nd step | Conv.[b] mol % | $M_n$[c] | $T_m$[d] ° C. | $dH_{fus}$[d] J/g |
| reference example 3 | 100:0 | 1000 | 130° C. 2 hr | — | 70 | 109,000 | 183 | —[1] |
| comparative example 6 | 80:20 | 300 | 130° C. 3 hr | — | 96 | 47,000 | —[1] | —[2] |
| comparative example 7 | 90:10 | 300[e] | 130° C. 3 hr | — | 97 | 136,000 | —[1] | —[2] |
| example 7 | 90:10 | 300 | 50° C. 6 hr | 130° C. 2 hr | 98 | 53,000 | 181 | 33.3 |
| example 8 | 90:10 | 300 | 60° C. 4 hr | 130° C. 2 hr | 98 | 52,000 | 182 | 38.2 |
| example 9 | 90:10 | 300 | 70° C. 2 hr | 130° C. 2 hr | 97 | 41,800 | 184 | 44.2 |
| exampel 10 | 90:10 | 300[e] | 90° C. 1 hr | 130° C. 3 hr | 97 | 143,000 | 177 | 9.0 |
| example 11 | 90:10 | 300 | 70° C. 2 hr | 110° C. 12 hr | 93 | 57,000 | 184 | 42.6 |
| example 12 | 80:20 | 300 | 70° C. 8.5 hr | 130° C. 2 hr | 98 | 56,000 | 181 | 29.1 |

[1]not analyzed.
[2]not detected
[a]The polymerizations were performed under N2 in toluene under the following conditions. rac:meso; mole ratios of rac:LA/meso-LA [M]/[cat] = 300: moles of monomer to catalyst
[b]monomer conversion; this was obtained with 300 MHz 1H NMR.
[c]Mn: number average molecular weight. Mw/Mn: polydispersity. Obtained with SEC. (polystyrene was used as standards).
[d]Tm: melting point. dHfus: heat of fusion. The polymers were purified with recrystallization in methanol, followd by analysation with DSC (The temperature was elevated twice.)
[e]The polymerizations were performed with the catalyst which was prepared in situ by mixing the ligand and Et3Al. No benzyl alchohol was added.

In Reference Example 3 in which the polymerization was performed in accordance with the conventional method, as disclosed in the conventional report (Polymer Journal, vol. 36, No. 3, pp. 261-264 (2004)), semi-crystalline PLA could be obtained from rac-LA. Further, it has been reported that this PLA has a stereocomplex crystalline structure, and it has a melting point of 183° C.

On the other hand, in Comparative Examples 6 and 12, the lactide mixture containing meso-LA was polymerized by one stage heating in a state where all lactide isomers were melted, and therefore, the resulting PLA was an amorphous polymer which did not have a melting point nor a heat of fusion.

In contrast, in Examples 6 to 11, a poly(meso-LA) block could be formed in the former stage of the polymerization by preferentially melting and polymerizing meso-LA through heating at a low temperature in the first stage, and thereafter, a crystalline poly(rac-LA) block could be formed in the latter stage of the polymerization by melting and polymerizing rac-LA through heating at a high temperature. Therefore, also in the bulk polymerization of various conditions without using a solvent, semi-crystalline PLA was successfully obtained from a mixture of rac-LA and meso-LA.

The invention claimed is:

1. A method for producing semi-crystalline polylactide from a mixture of racemic lactide and meso-lactide, wherein when the mixture is polymerized using a catalyst capable of iso-selectively polymerizing L-lactide and D-lactide, an amorphous poly (meso-lactide) block is formed from meso-lactide and a semi-crystalline poly(racemic lactide) block is formed from racemic lactide by separately polymerizing racemic lactide and meso-lactide by taking advantage of a difference in physicochemical properties between racemic lactide and meso-lactide, whereby polylactide which is semi-crystalline as a whole is produced.

2. The method according to claim 1, wherein meso-lactide and racemic lactide are separately polymerized in such a manner that meso-lactide in the mixture is polymerized by adding a small amount of a solvent to the mixture to preferentially dissolve meso-lactide having a higher solubility in the solvent, and thereafter racemic lactide is polymerized, whereby semi-crystalline polylactide is produced.

3. The method according to claim 1, wherein meso-lactide and racemic lactide are separately polymerized in such a manner that first polymerization is performed for the mixture at a temperature in a first temperature range in which meso-lactide having a low melting point melts so as to preferentially melt and polymerize meso-lactide until meso-lactide is consumed, and thereafter second polymerization is performed at a temperature in a second temperature range which is higher than the first temperature range and in which racemic lactide having a high melting point melts so as to melt and polymerize residual racemic lactide, whereby semi-crystalline polylactide is produced.

4. The method according to claim 3, wherein the first temperature range is 50° C. or higher and 130° C. or lower, and the second temperature range is 55° C. or higher and 250° C. or lower.

* * * * *